Dec. 5, 1967    D. J. RYAN    3,355,768
APPARATUS FOR MAKING THERMOPLASTIC FILMS
Filed June 5, 1964

United States Patent Office 3,355,768
Patented Dec. 5, 1967

3,355,768
APPARATUS FOR MAKING THERMOPLASTIC FILMS
Daniel J. Ryan, Chester, Pa., assignor to FMC Corporation, Philadelphia, Pa., a corporation of Delaware
Filed June 5, 1964, Ser. No. 372,909
6 Claims. (Cl. 18—14)

ABSTRACT OF THE DISCLOSURE

Apparatus for making oriented films in which reaches of a plurality of endless cables are engaged with the internal surface of a freshly extruded tubing as it issues from an annular die, after which such reaches are directed along diverging paths to stretch and thus orient the tubing. At locations spaced from the annular die, the now oriented tubing is slit into films and the paths of the endless cables are reversed and directed toward and through the annular die itself.

Figure 1:
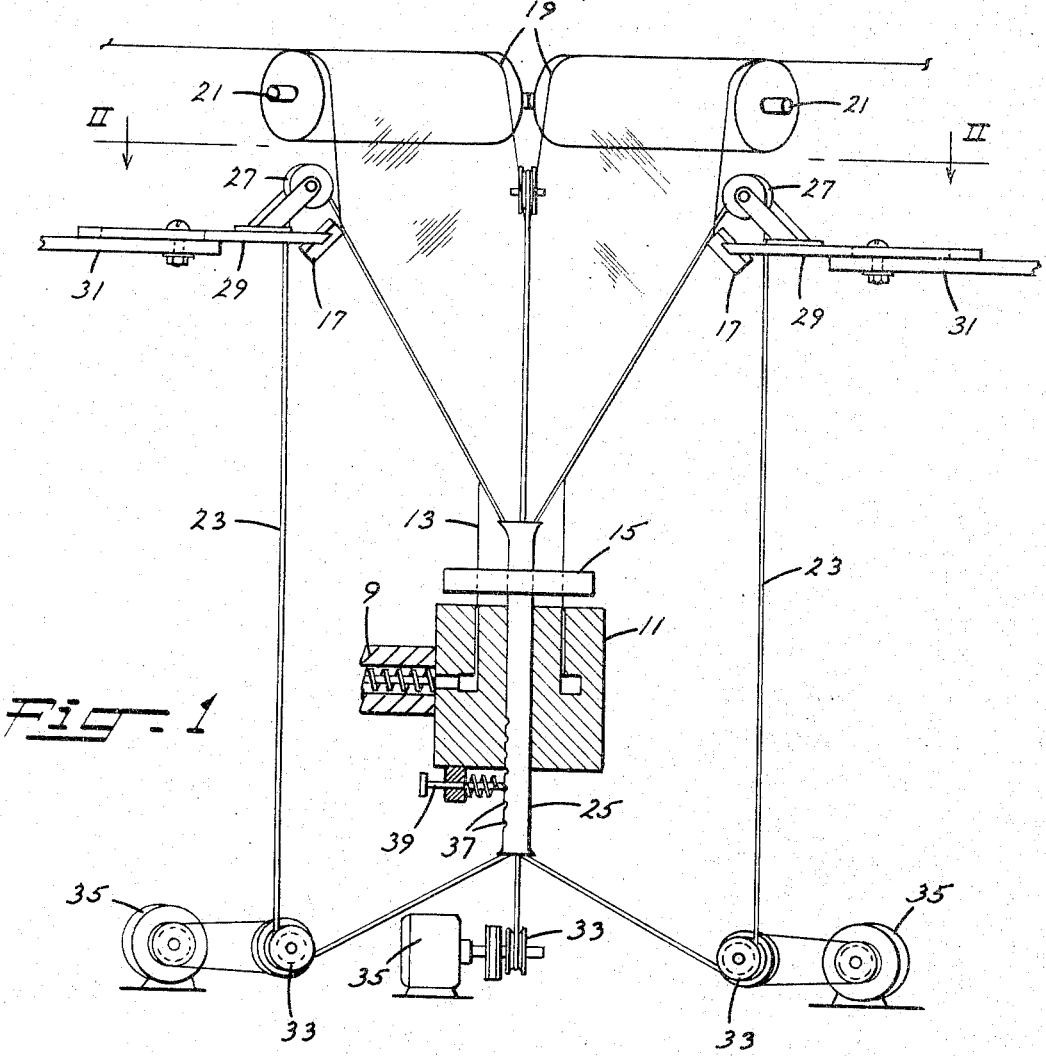

This invention relates to the manufactuer of films and more particularly to an improved apparatus for making oriented films from tubing formed of thermoplastic polymeric materials.

In a conventional method of making films from tubing, a freshly extruded tubing is generally expanded by a bubble of fluid which is contained between the extrusion die and a pair of nip rolls, after which the tubing is slit into two or more films. A critical objection to this and other similar procedures is that the contained bubble of fluid effects stretching of the tubing immediately as it issues from the extrusion device so that the molten and thus more yieldable portion of tubing is made thinner without providing for any appreciable degree of orientation therein. In other words, the expansive effect of the bubble of fluid is dissipated in stretching the portions of the tubing which are in a more yieldable condition but which are not capable of retaining orientation. Proposals for remedying the above described disadvantage have been satisfactory to some degree but, in general, lack the flexibility which would permit their use with different materials and often require extremely accurate and continuous control. Accordingly, a primary object of this invention is the provision of an improved apparatus for making oriented films from tubing formed of thermoplastic polymeric materials.

Another object is the provision of an improved and simple apparatus for effecting a controlled uniaxial or biaxial stretching of an extruded thin-walled tubing of thermoplastic polymeric material.

Still further objects are apparent from the following description.

The objects are accomplished in accordance with the present invention by an improved apparatus in which an extruded tubing of heated or molten thermoplastic polymeric material is cooled to a temperature range within which the thermoplastic material may be oriented, after which the internal surface of the tubing is engaged along at least two circumferentially spaced locations and then stretched at least along one of its transverse and longitudinal directions. Transverse stretching of the tubing may be achieved by directing the engaged portions thereof along diverging paths, while longitudinal stretching is best effected by advancing the engaged tubing portions at a faster rate than the rate at which the tubing is extruded. During or after stretching of the tubing, the tubing is cooled to a temperature below the orientation temperature range and is then slit into two or more films.

The apparatus of the present invention is one in which one reach of each of a plurality of endless cables is engaged with the internal surface of a freshly extruded tubing as it issues from an annular die after which such opposing reaches are caused to travel along paths which diverge relative to the tubing axis. In this manner the tubing is stretched and oriented in a transverse direction concomitantly with its advancement. At locations spaced from the annular die the oriented tubing is slit into films and the paths of the endless cables are reversed. The endless cables are led into the extruded tubing by a guide tube which extends through the extrusion die and is adjustable relative thereto so that the locations at which the cables first engage with the internal surface of the tubing may be varied. Means are provided for positively driving the endless cables whereby the tubing may be advanced at such a rate as to effect longitudinal orientation thereof substantially concomitantly with its transverse stretching.

The apparatus of the present invention is not limited for use with any particualr thermoplatsic polymeric materials or any specific set of operating conditions. Further, it will be apparent that the orientation imparted to the thermoplastic materials may extend transversely or both transversely and longitudinally of the resulting films and that in the latter instance may but need not be balanced along both axial directions.

Figure 2:
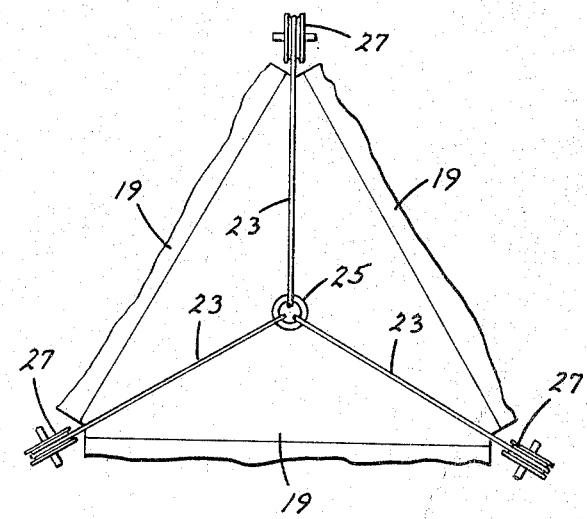

In the drawing, FIGURE 1 is a diagrammatic illustration of the apparatus of the present invention in use; and FIGURE 2 is a transverse section taken substantially along the lines II—II of FIGURE 1.

With reference to the drawing, FIGURE 1 diagrammatically illustrates a portion of a conventional screw extruder 9 having an annular die 11 from which a molten thermoplastic polymeric material may be continuously extruded as a seamless thin-walled tubing 13. A ring 15 is provided for directing cool air or other gas against the extruded tubing 13 to chill the same to within a range of temperatures at which the particular thermoplastic may be oriented. At locations spaced from the die 11 the tubing 13 is slit by knives 17 into a plurality of films 19 which are collected upon separate take-up cores 21 driven at substantially the same rate of speed by suitable means, not shown.

The tubing 13 is stretched in a transverse direction concomitantly with its advancement by endless cables 23, with at least two, and preferably three, of such cables being employed. The opposing reaches of the endless cables 23 are led up into and through the annular extrusion die 11 by a guide tube 25 and are engaged with the internal surface of the tubing 13 as they travel along diverging paths toward and over pulleys 27. The tubing 13 is slit as it approaches the pulleys 27, with both the slitting knives 17 and the pulleys 27 being mounted on carriages 29 which are adjustably fixed to support plates 31. Form the pulleys 27 the cables are laced about pulleys 33 which are all driven at substantially the same rate of speed by motor 35.

As illustrated on the drawing, the guide tube 25 is mounted for movement relative to the extrusion die 11 and is provided with recesses 37 for receiving a spring loaded retaining pin 39. The exit end of the tube 25 is widened to permit a smooth and gradual outward movement of the endless cables and, if desired, may be fitted with rollers to minimize friction.

In operation, molten thermoplastic polymeric material is delivered by the extruder 9 and is shaped into the form of the tubing 13 as it issues from the extrusion die 11. Chilled air from the ring 15 serves to cool the tubing 13 to such an extent that it is within the orientation temperature range when its internal surface is engaged by the opposing reaches of the endless cables 23. The temperature of the cool air delivered by the ring 15 may be varied to suit the particular polymeric material being extruded.

It is preferred, however, that the temperature of the quenching air remain substantially constant and that the distance of free travel of the tubing 13 be varied by adjusting the position of the guide tube 25 relative to the die 11.

Once engaged with the internal surface of the tubing 13, the endless cables carry and stretch the same in a transverse direction until it is cut by the knives 17 into films 19.

The degree of transverse stretching may, of course, be varied by adjusting the positions of the carriages 29 radially relative to the axis of the tubing 13. Further, if desired, the motors 35 may drive the endless cables 23 and the engaged portions of the tubing 13 at a rate of speed which exceeds the rate of extrusion so as to provide for longitudinal stretching of the tubing concomitantly with its transverse orientation. Additionally, it will be apparent that the separation between the endless cables 23 may be varied from the substantially equal spacing illustrated on the drawing, and that either the cable spacing and/or the position of the knives 17 may be changed to provide films 19 which are of different widths.

It is to be understood that changes and variations may be made without departing from the spirit and scope of the invention as defined in the appended claims.

I claim:

1. Apparatus for making oriented films from thermoplastic polymeric materials including an annular die, means for continuously extruding heated thermoplastic material from the annular die in the form of a tubing, means spaced from said die for slitting the extruded tubing into at least two films, means engaging with the films for advancing the same away from said slitting means, at least two movable endless cables, each of said cables having one reach extending through said annular die for engaging with the internal surface of the extruded tubing and means for directing said reaches of the endless cables along diverging paths to thereby stretch the tubing in a transverse direction concomitantly with its advancement.

2. Apparatus as defined in claim 1 further including means for engaging and positively advancing said cables.

3. Apparatus for making oriented films from thermoplastic polymeric materials including an annular die, means for continuously extruding heated thermoplastic material from the annular die in the form of a tubing, means for slitting the extruded tubing into at least two films, means engaging with the films for advancing the same away from said slitting means, a guide tube extending through said annular die, at least two movable endless cables, each of said cables having one reach passing through said guide tube for engaging with the internal surface of the extruded tubing, and means for directing said reaches of the endless cables along diverging paths to thereby stretch the tubing in a transverse direction concomitantly with its advancement.

4. Apparatus as defined in claim 3 wherein said guide tube is adjustable relative to said die so as to permit variation in the positions at which said reaches of the endless cables first engage with the extruded tubing.

5. Apparatus as defined in claim 3 further including means for positively advancing said cables.

6. Apparatus for making oriented films from thermoplastic polymeric materials including an annular die, means for continuously extruding heated thermoplastic material from the annular die in the form of a tubing, means spaced from said die for slitting the extruded tubing into at least two films, means engaging with the films for advancing the same away from said slitting means, a guide tube extending substantially centrally of said annular die, means for adjusting said guide tube axially relative to said die, at least two endless cables, means for positively advancing said cables, said cables each having one reach passing through said guide tube for gripping the extruded tubing and advancing the same away from said die, guide pulleys located adjacent to said slitting means for reversing the paths of the endless cables and means for moving said guide pulleys radially of the axis of said annular die so as to direct said reaches of said cables along diverging paths as they travel between said guide tube and pulleys.

References Cited

UNITED STATES PATENTS

| | | | |
|---|---|---|---|
| 2,770,007 | 11/1956 | Longstreet et al. | 18—145 XR |
| 3,160,918 | 12/1964 | Berggren et al. | 18—145 |
| 3,193,547 | 7/1965 | Schott | 264—209 |
| 3,217,361 | 11/1965 | Ryan et al. | 18—145 |

WILLIAM J. STEPHENSON, *Primary Examiner.*